(12) United States Patent
Aoyama et al.

(10) Patent No.: US 11,566,372 B2
(45) Date of Patent: Jan. 31, 2023

(54) METHOD FOR DEFIBRATING FIBER BODY, DEFIBRATING DEVICE, SHEET MANUFACTURING METHOD, AND SHEET MANUFACTURING APPARATUS

(71) Applicant: SEIKO EPSON CORPORATION, Tokyo (JP)

(72) Inventors: Tetsuya Aoyama, Shiojiri (JP); Shinichi Kato, Matsumoto (JP); Shigemi Wakabayashi, Azumino (JP); Yoshihiro Ueno, Shiojiri (JP); Shunichi Seki, Suwa (JP); Takumi Sago, Matsumoto (JP); Hiroki Kurata, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 321 days.

(21) Appl. No.: 16/700,071

(22) Filed: Dec. 2, 2019

(65) Prior Publication Data

US 2020/0173102 A1    Jun. 4, 2020

(30) Foreign Application Priority Data

Nov. 30, 2018    (JP) .............................. JP2018-225823

(51) Int. Cl.
*D21B 1/32*    (2006.01)

(52) U.S. Cl.
CPC ...................... *D21B 1/32* (2013.01)

(58) Field of Classification Search
CPC ....................................................... D21B 1/32
See application file for complete search history.

(56) References Cited

U.S. PATENT DOCUMENTS

| 2,105,498 A | * | 1/1938 | Parrett | ..................... C08B 1/02 536/70 |
| 2006/0118667 A1 | | 6/2006 | Yamada | |
| 2018/0010271 A1 | | 1/2018 | Yamada | |
| 2019/0257013 A1 | | 8/2019 | Yamada | |

FOREIGN PATENT DOCUMENTS

| CA | 1340299 C | * | 1/1999 | ............ D06M 13/12 |
| CN | 107206621 A | | 9/2017 | |
| JP | S56-49092 A | | 5/1981 | |
| JP | S57-101090 A | | 6/1982 | |
| JP | H06-292837 A | | 10/1994 | |
| JP | H11-293578 A | | 10/1999 | |
| JP | 2003102781 A | * | 4/2003 | |
| JP | 2005-9062 A | | 1/2005 | |
| JP | 2017-155355 A | | 9/2017 | |
| JP | 2017-177087 A | | 10/2017 | |
| JP | 2018-86822 A | | 6/2018 | |

* cited by examiner

*Primary Examiner* — Jacob T Minskey (74) *Attorney, Agent, or Firm* — Oliff PLC (57) ABSTRACT

A method for defibrating a fiber body includes: a supply step of supplying a liquid to a fiber body containing fibers; and a defibrating step of defibrating the fiber body to which the liquid is supplied, and in the supply step, the liquid is supplied to the fiber body so that a rate in tensile strength of the fiber body immediately before defibrated in the defibrating step to the fiber body before the liquid is supplied thereto is 60.0% or less.

3 Claims, 6 Drawing Sheets

|  | LIQUID 1 | LIQUID 2 | LIQUID 3 | LIQUID 4 | LIQUID 5 |
|---|---|---|---|---|---|
| MOISTURIZER | 15 | 15 | — | 3 | 30 |
| SURFACE TENSION CONTROLLER | 1 | — | 1 | 1 | 1 |
| WATER | BALANCE | BALANCE | BALANCE | BALANCE | BALANCE |
| SURFACE TENSION [mN/m] | 34 | 60 | 35 | 34 | 33 |
| INFILTRATION PROPERTY | A | C | A | A | A |
| MOISTURE RETENTION PROPERTY | A | A | C | C | A |

FIG. 7

| | EXAMPLE 1 | EXAMPLE 2 | EXAMPLE 3 | EXAMPLE 4 | EXAMPLE 5 | EXAMPLE 6 | EXAMPLE 7 | COMPARATIVE EXAMPLE 1 | COMPARATIVE EXAMPLE 2 |
|---|---|---|---|---|---|---|---|---|---|
| LIQUID | LIQUID 1 | LIQUID 1 | LIQUID 1 | LIQUID 1 | LIQUID 1 | LIQUID 2 | LIQUID 3 | LIQUID 1 | — |
| APPLICATION AMOUNT [g/A4] | 0.7 | 1.3 | 2.3 | 3.0 | 3.3 | 1.3 | 1.3 | 0.6 | — |
| TENSILE STRENGTH [N] | 58.2 | 40.5 | 11.6 | 5.7 | 4.2 | 39.5 | — | 64.2 | 100.9 |
| RATE IN TENSILE STRENGTH [%] | 58 | 40 | 11 | 6 | 4 | 39 | — | 64 | 100 |
| MOISTURE CONTENT IMMEDIATELY BEFORE DEFIBRATION [%] | 13.5 | 20.8 | 34.2 | 41.2 | 45.1 | 21.8 | 25.5 | 12.3 | 6.6 |
| DEFIBRATING PROPERTY | B | A | A | A | A* | B | A | C | C |
| ELECTRIFICATION PROPERTY | B | A | A | A | A | A | A | C | C |

FIG. 8

|  | EXAMPLE 8 | COMPARATIVE EXAMPLE 3 |
|---|---|---|
| LIQUID | LIQUID 1 | LIQUID 1 |
| APPLICATION AMOUNT [g/A4] | 1.8 | 1.8 |
| DEFIBRATION TIMING | ONE HOUR AFTER APPLICATION | 24 HOURS AFTER APPLICATION |
| TENSILE STRENGTH IMMEDIATELY BEFORE DEFIBRATION [N] | 41.0 | 78.8 |
| RATE IN TENSILE STRENGTH [%] | 41 | 78 |
| MOISTURE CONTENT IMMEDIATELY BEFORE DEFIBRATION [%] | 21.1 | 10.3 |
| DEFIBRATING PROPERTY | A | C |
| ELECTRIFICATION PROPERTY | A | C |

FIG. 9

|  |  | EXAMPLE 9 | EXAMPLE 10 | EXAMPLE 11 | EXAMPLE 12 | EXAMPLE 13 | COMPARATIVE EXAMPLE 4 |
|---|---|---|---|---|---|---|---|
| LIQUID | | LIQUID 1 | LIQUID 1 | LIQUID 3 | LIQUID 4 | LIQUID 5 | ONLY PURIFIED WATER |
| APPLICATION AMOUNT [g/A4] | | 1.3 | 3.0 | 1.3 | 1.3 | 3.0 | 1.3 |
| CONTENT OF MOISTURIZER IN SHEET [%] | | 4.7 | 10.1 | 0.0 | 0.9 | 20.2 | 0.0 |
| DEFIBRATING PROPERTY | 30 MINUTES AFTER APPLICATION | A | A | B | B | A | C |
|  | ONE HOUR AFTER APPLICATION | A | A | B | B | A | C |
| ELECTRIFICATION PROPERTY | 30 MINUTES AFTER APPLICATION | A | A | B | A | A | C |
|  | ONE HOUR AFTER APPLICATION | A | A | B | B | A | C |

METHOD FOR DEFIBRATING FIBER BODY, DEFIBRATING DEVICE, SHEET MANUFACTURING METHOD, AND SHEET MANUFACTURING APPARATUS

The present application is based on, and claims priority from JP Application Serial Number 2018-225823, filed Nov. 30, 2018, the disclosure of which is hereby incorporated by reference herein in its entirety.

BACKGROUND

1. Technical Field

The present disclosure relates to a method for defibrating a fiber body, a defibrating device, a sheet manufacturing method, and a sheet manufacturing apparatus.

2. Related Art

In recent years, in view of environmental protection and the like, recycled paper recycled from waste paper has been increasingly in demand. When waste paper is recycled as described above, in general, in order to form fibers by disentangling waste paper, a defibrating treatment is performed.

For example, JP-A-11-293578 has disclosed that in order to prevent the generation of static electricity, defibration is performed by supplying air mixed with water droplets to a main body of a defibrating device.

When paper is defibrated by the defibrating device as described above, a large electric power is required to cleave the hydrogen bonds of celluloses. Hence, in view of energy saving, the defibration is required to be efficiently performed.

SUMMARY

A method for defibrating a fiber body according to an aspect of the present disclosure comprises: a supply step of supplying a liquid to a fiber body containing fibers; and a defibrating step of defibrating the fiber body to which the liquid is supplied, and in the supply step, the liquid is supplied to the fiber body so that a rate in tensile strength of the fiber body immediately before defibrated in the defibrating step to the fiber body before the liquid is supplied thereto is 60.0% or less.

A method for defibrating a fiber body according to another aspect of the present disclosure comprises: a supply step of supplying a liquid to a fiber body containing fibers; and a defibrating step of defibrating the fiber body to which the liquid is supplied, and in the supply step, the liquid is supplied to the fiber body so that a moisture content of the fiber body immediately before defibrated in the defibrating step is 13.5% to 45.1%.

In the method for defibrating a fiber body according to the aspect described above, in the supply step, the liquid may be supplied to the fiber body so that the moisture content of the fiber body immediately before defibrated in the defibrating step is 20.8% to 41.2%.

In the method for defibrating a fiber body according to the aspect described above, the liquid may contain water and a moisturizer.

In the method for defibrating a fiber body according to the aspect described above, a rate of the mass of the moisturizer to the mass of the fiber body to which the liquid is supplied may be 4.7% to 20.2%.

In the method for defibrating a fiber body according to the aspect described above, the fiber body is a sheet, and between the supply step and the defibrating step, a pulverizing step of coarsely pulverizing the fiber body to which the liquid is supplied may also be provided.

A defibrating device according to another aspect of the present disclosure comprises: a liquid supply portion supplying a liquid to a fiber body containing fibers: and a defibrating portion defibrating the fiber body to which the liquid is supplied, and the liquid supply portion supplies the liquid to the fiber body so that a rate in tensile strength of the fiber body immediately before defibrated by the defibrating portion to the fiber body before the liquid is supplied thereto is 60.0% or less.

A defibrating device according to another aspect of the present disclosure comprises: a liquid supply portion supplying a liquid to a fiber body containing fibers: and a defibrating portion defibrating the fiber body to which the liquid is supplied, and the liquid supply portion supplies the liquid to the fiber body so that a moisture content of the fiber body immediately before defibrated by the defibrating portion is 13.5% to 45.1%.

In the defibrating device according to the aspect described above, the liquid supply portion may supply the liquid to the fiber body so that the moisture content of the fiber body immediately before defibrated by the defibrating portion is 20.8% to 41.2%.

In the defibrating device according to the aspect described above, the liquid may contain water and a moisturizer.

In the defibrating device according to the aspect described above, the liquid supply portion may be an ink jet application unit or a spray application unit.

A sheet manufacturing method according to another aspect of the present disclosure comprises: a supply step of supplying a liquid to a fiber body containing fibers; a defibrating step of defibrating the fiber body to which the liquid is supplied to form a defibrated material; a web depositing step of depositing the defibrated material to form a web; and a web transport step of transporting the web, and in the supply step, the liquid is supplied to the fiber body so that a rate in tensile strength of the fiber body immediately before defibrated in the defibrating step to the fiber body before the liquid is supplied thereto is 60.0% or less.

A sheet manufacturing method according to another aspect of the present disclosure comprises: a supply step of supplying a liquid to a fiber body containing fibers; a defibrating step of defibrating the fiber body to which the liquid is supplied to form a defibrated material; a web depositing step of depositing the defibrated material to form a web; and a web transport step of transporting the web, and in the supply step, the liquid is supplied to the fiber body so that a moisture content of the fiber body immediately before defibrated in the defibrating step is 13.5% to 45.1%.

A sheet manufacturing apparatus according to another aspect of the present disclosure comprises: a liquid supply portion supplying a liquid to a fiber body containing fibers; a defibrating portion defibrating the fiber body to which the liquid is supplied to form a defibrated material; a deposition portion depositing the defibrated material to form a web; and a transport portion transporting the web, and the liquid supply portion supplies the liquid to the fiber body so that a rate in tensile strength of the fiber body immediately before defibrated by the defibrating portion to the fiber body before the liquid is supplied thereto is 60.0% or less.

A sheet manufacturing apparatus according to another aspect of the present disclosure comprises: a liquid supply portion supplying a liquid to a fiber body containing fibers;

a defibrating portion defibrating the fiber body to which the liquid is supplied to form a defibrated material; a deposition portion depositing the defibrated material to form a web; and a transport portion transporting the web, and the liquid supply portion supplies the liquid to the fiber body so that a moisture content of the fiber body immediately before defibrated by the defibrating portion is 13.5% to 45.1%.

DESCRIPTION OF EXEMPLARY EMBODIMENTS

Hereinafter, preferable embodiments of the present disclosure will be described in detail with reference to the attached drawings. In addition, the following embodiments do not unreasonably limit the contents of the present disclosure described in the claims. In addition, all the elements described below are not always required to be essential constituent elements of the present disclosure.

1. Sheet Manufacturing Apparatus

Figure 1:
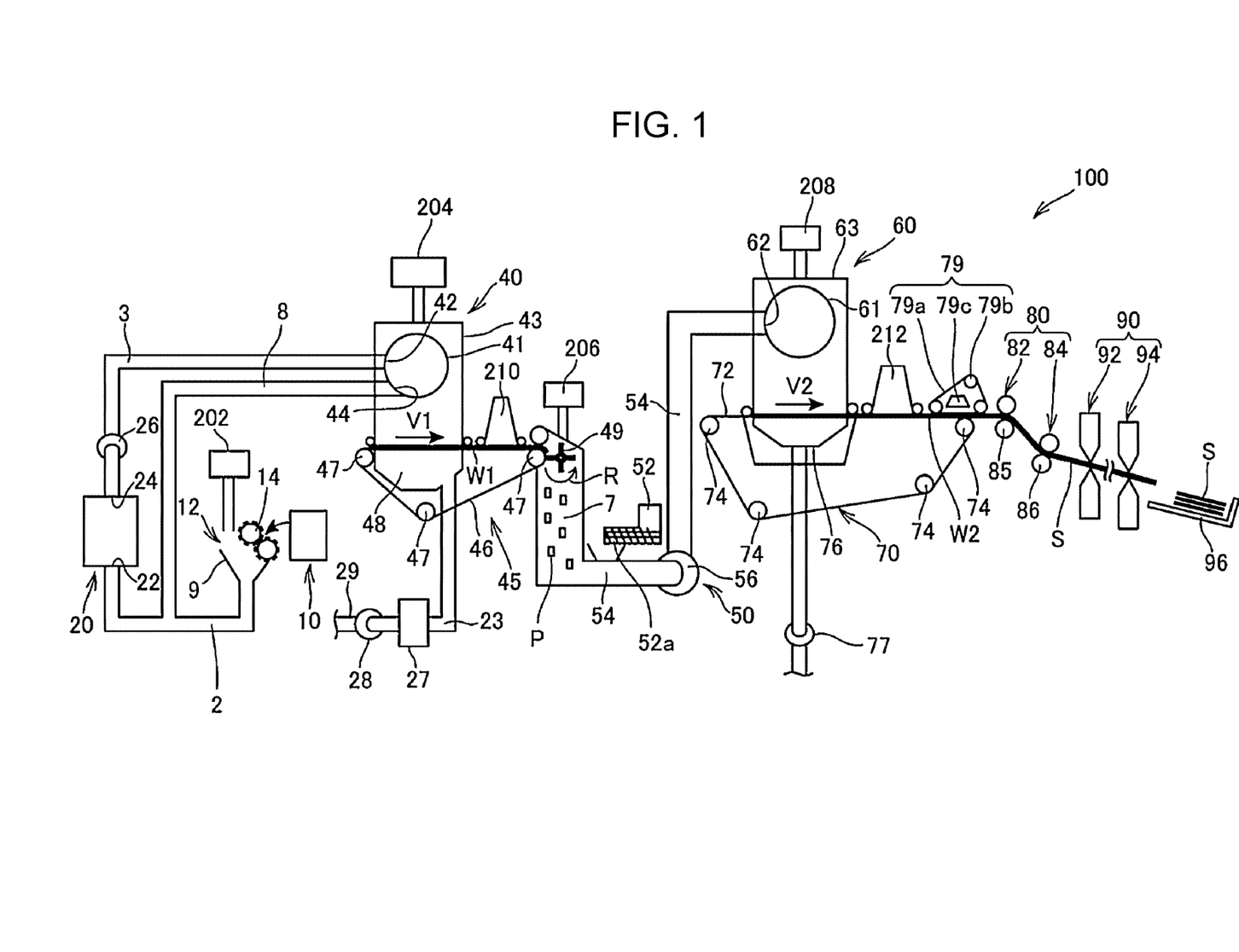
FIG. 1 is a schematic view showing a sheet manufacturing apparatus according to this embodiment.

First, a sheet manufacturing apparatus according to this embodiment will be described with reference to the attached drawing. FIG. 1 is a schematic view showing a sheet manufacturing apparatus 100 according to this embodiment.

The sheet manufacturing apparatus 100 is, for example, a preferable apparatus which manufactures new paper by defibrating used waste paper as a raw material into fibers by a dry method, followed by pressure application, heating, and cutting. By various additives which are mixed with the raw material thus defibrated into fibers, in accordance with the application, a bond strength of a paper product and the degree of whiteness thereof may be improved, and/or functions, such as color, smell, and flame retardance, may also be obtained. In addition, since paper is formed while the density, the thickness, and the shape thereof are controlled, in accordance with the application, such as office paper having an A4 or an A3 size or paper for name cards, paper having various thicknesses and sizes can be manufactured.

The sheet manufacturing apparatus 100 includes, for example, a supply portion 10, a coarsely pulverizing portion 12, a defibrating portion 20, a sorting portion 40, a first web forming portion 45, a rotation body 49, a mixing portion 50, a deposition portion 60, a second web forming portion 70, a transport portion 79, a sheet forming portion 80, and a cutting portion 90.

In order to humidify the raw material, a space in which the raw material is transferred, and the like, the sheet manufacturing apparatus 100 may further include humidifying portions 202, 204, 206, 208, 210, and 212.

The humidifying portions 202, 204, 206, and 208 are each formed, for example, of a vaporization type or a hot-wind vaporization type humidifier. That is, the humidifying portions 202, 204, 206, and 208 each have a filter (not shown) to be infiltrated with water and each supply humidified air having an increased humidity by allowing air to pass through the filter. The humidifying portions 202, 204, 206, and 208 each may also include a heater (not shown) which effectively increases the humidity of the humidified air.

The humidifying portions 210 and 212 are each formed, for example, of an ultrasonic type humidifier. That is, the humidifying portions 210 and 212 each include a vibration portion (not shown) which atomizes water and each supply mist generated by the vibration portion.

The supply portion 10 supplies the raw material to the coarsely pulverizing portion 12. The raw material to be supplied to the coarsely pulverizing portion 12 may be any material as long as containing fibers, and for example, there may be mentioned paper, pulp, a pulp sheet, a non-woven cloth, a cloth, or a woven fabric. In this embodiment, the structure of the sheet manufacturing apparatus 100 in which waste paper is used as the raw material will be described by way of example. The supply portion 10 includes, for example, a stacker in which waste paper is stacked and stored and an automatic charge device feeding the waste paper from the stacker to the coarsely pulverizing portion 12. In addition, a plurality of the waste paper is not always required to be aligned and stacked to each other, and waste paper having various sizes and waste paper having various shapes may be irregularly supplied to the stacker.

The coarsely pulverizing portion 12 cuts the raw material supplied by the supply portion 10 using coarsely pulverizing blades 14 into coarsely pulverized pieces. The coarsely pulverizing blade 14 cuts the raw material in a gas such as the air. The coarsely pulverizing portion 12 includes, for example, a pair of the coarsely pulverizing blades 14 which sandwich and cut the raw material and a drive portion which rotates the coarsely pulverizing blades 14 and can be formed to have a structure similar to that of a so-called shredder. The shape and the size of the coarsely pulverized pieces are arbitrary and may be appropriately determined so as to be suitable to a defibrating treatment in the defibrating portion 20. The coarsely pulverizing portion 12 cuts the raw material into pieces having a size of, for example, one centimeter square to several centimeters square or pieces smaller than that described above.

The coarsely pulverizing portion 12 includes a shoot 9 receiving the coarsely pulverized pieces which fall down after being cut by the coarsely pulverizing blades 14. The shoot 9 has, for example, a tapered shape in which the width thereof is gradually decreased in a direction along which the coarsely pulverized pieces flow down. Hence, the shoot 9 is able to receive many coarsely pulverized pieces. A tube 2 which communicates with the defibrating portion 20 is coupled to the shoot 9 to form a transport path through which the coarsely pulverized pieces are transported to the defibrating portion 20. The coarsely pulverized pieces are collected by the shoot 9 and are transported to the defibrating portion 20 through the tube 2. The coarsely pulverized pieces are transported by an air stream generated by, for example, a blower (not shown) toward the defibrating portion 20 through the tube 2.

To the shoot 9 of the coarsely pulverizing portion 12 or the vicinity of the shoot 9, humidified air is supplied by the humidifying portion 202. Accordingly, the coarsely pulverized pieces cut by the coarsely pulverizing blades 14 are suppressed from being adhered to inner surfaces of the shoot 9 and the tube 2 caused by static electricity. In addition, since the coarsely pulverized pieces cut by the coarsely pulverizing blades 14 are transported to the defibrating portion 20 together with humidified air having a high humidity, an effect of suppressing the adhesion of a defibrated material in the defibrating portion 20 can also be anticipated. In addition, the humidifying portion 202 may also be configured so as to supply humidified air to the coarsely pulverizing blades 14 and to remove electricity of the raw material supplied by the supply portion 10. In addition, besides the humidifying portion 202, removal of electricity may also be performed using an ionizer.

The defibrating portion 20 defibrates the coarsely pulverized pieces cut in the coarsely pulverizing portion 12. In more particular, in the defibrating portion 20, the raw material cut by the coarsely pulverizing portion 12 is processed by the defibrating treatment to produce a defibrated material. In this case, the "defibrate" indicates that the raw material formed of fibers bound to each other is disentangled into separately independent fibers. The defibrating portion 20 may also have a function to separate substances, such as resin particles, an ink, a toner, and a blurring inhibitor, each of which is adhered to the raw material, from the fibers.

A material passing through the defibrating portion 20 is called a "defibrated material". In the "defibrated material", besides the fibers thus disentangled, resin particles, that is, resin particles functioning to bind fibers together; coloring materials, such as an ink and a toner; and additives, such as a blurring inhibitor and a paper strength improver, which are separated from the fibers when the fibers are disentangled, may also be contained in some cases. The defibrated material thus disentangled has a string shape or a ribbon shape. The defibrated material thus disentangled may be present in a state, that is, in an independent state, so as not to be entangled with other disentangled fibers or may be present in a state, that is, in a state in which so-called "damas" are formed, so as to be entangled together to form lumps.

The defibrating portion 20 performs dry defibration. In this case, a treatment, such as defibration, which is performed not in a liquid but in a gas, such as the air, is called a dry type. The defibrating portion 20 is formed, for example, to use an impellor mill. In particular, although not shown in the drawing, the defibrating portion 20 includes a high-speed rotating rotor and a liner disposed around the outer circumference of the rotor. The coarsely pulverized pieces cut by the coarsely pulverizing portion 12 are sandwiched between the rotor and the liner of the defibrating portion 20 and are then defibrated thereby. The defibrating portion 20 generates an air stream by the rotation of the rotor. By this air stream, the defibrating portion 20 sucks the coarsely pulverized pieces functioning as the raw material through the tube 2, and the defibrated material can be transported to a discharge port 24. The defibrated material is fed to a tube 3 from the discharge port 24 and then transported to the sorting portion 40 through the tube 3.

As described above, the defibrated material produced in the defibrating portion 20 is transported to the sorting portion 40 from the defibrating portion 20 by the air stream generated thereby. Furthermore, in the example shown in the drawing, the sheet manufacturing apparatus 100 includes a defibrating blower 26 functioning as an air stream generator, and by an air stream generated by the defibrating blower 26, the defibrated material is transported to the sorting portion 40. The defibrating blower 26 is provided for the tube 3, and air is sucked together with the defibrated material from the defibrating portion 20 and then sent to the sorting portion 40.

The sorting portion 40 includes an inlet port 42 into which the defibrated material defibrated in the defibrating portion 20 flows together with the air stream through the tube 3. The sorting portion 40 sorts the defibrated material introduced into the inlet port 42 by the length of the fibers. In particular, the sorting portion 40 sorts the defibrated material defibrated in the defibrating portion 20 into a defibrated material having a predetermined size or less as a first sorted material and a defibrated material larger than the first sorted material as a second sorted material. The first sorted material includes fibers, particles, and the like, and the second sorted material includes, for example, large fibers, non-defibrated pieces, coarsely pulverizing pieces which are not sufficiently defibrated, and damas which are formed since defibrated fibers are aggregated or entangled with each other.

The sorting portion 40 includes, for example, a drum portion 41 and a housing portion 43 receiving the drum portion 41.

The drum portion 41 is a cylindrical sieve which is rotatably driven by a motor. The drum portion 41 has a net and functions as a sieve. By the meshes of this net, the drum 41 sorts the first sorted material smaller than the sieve opening of the net and the second sorted material larger than the sieve opening of the net. As the net of the drum portion 41, for example, there may be used a metal net, an expanded metal formed by expanding a metal plate provided with cut lines, or a punched metal in which holes are formed in a metal plate by a press machine or the like.

The defibrated material introduced into the inlet port 42 is fed together with the air stream to the inside of the drum portion 41, and by the rotation of the drum portion 41, the first sorted material is allowed to fall down through the meshes of the net of the drum portion 41. The second sorted material which is not allowed to pass through the meshes of the net of the drum portion 41 is guided to a discharge port 44 by the air stream flowing into the drum portion 41 from the inlet port 42 and is then fed to a tube 8.

The tube 8 communicates between the inside of the drum portion 41 and the tube 2. The second sorted material which flows through the tube 8 flows together with the coarsely pulverized pieces cut by the coarsely pulverizing portion 12 in the tube 2 and is then guided to an inlet port 22 of the defibrating portion 20. Accordingly, the second sorted material is returned to the defibrating portion 20 and is then subjected to the defibrating treatment.

In addition, the first sorted material sorted by the drum portion 41 is dispersed in air through the meshes of the net of the drum portion 41 and is then allowed to fall down to a mesh belt 46 of the first web forming portion 45 located under the drum portion 41.

The first web forming portion 45 includes the mesh belt 46, rollers 47, and a suction portion 48. The mesh belt 46 is an endless belt, is suspended by the three rollers 47, and by the movement of the rollers 47, is transported in a direction shown by an arrow in the drawing. The surface of the mesh belt 46 is formed of a net in which openings having a predetermined size are arranged. Of the first sorted material which is allowed to fall down from the sorting portion 40, fine particles passing through the meshes of the net fall down to a lower side of the mesh belt 46, and fibers having a size which are not allowed to pass through the meshes of the net are deposited on the mesh belt 46 and are transported therewith in the arrow direction. The fine particles which fall down through the mesh belt 46 include particles having a relatively small size and/or a low density of the defibrated material, that is, include resin particles which are not necessary for binding between the fibers, coloring materials, additives, and the like, and the fine particles are unnecessary materials which will not be used for manufacturing of a sheet S by the sheet manufacturing apparatus 100.

The mesh belt 46 is transferred at a predetermined velocity V1 during a normal operation for manufacturing of the sheet S. In the case described above, "during the normal operation" indicates during the operation other than that performing a start control and a stop control of the sheet manufacturing apparatus 100 and, in more particular, indicates during manufacturing of a sheet S having a preferable quality by the sheet manufacturing apparatus 100.

Accordingly, the defibrated material processed by the defibrating treatment in the defibrating portion 20 is sorted into the first sorted material and the second sorted material in the sorting portion 40, and the second sorted material is returned to the defibrating portion 20. In addition, from the first sorted material, the unnecessary materials are removed by the first web forming portion 45. The residues obtained after the unnecessary materials are removed from the first sorted material are a material suitable for manufacturing of the sheet S, and this material is deposited on the mesh belt 46 to form a first web W1.

The suction portion 48 sucks air under the mesh belt 46. The suction portion 48 is coupled to a dust collection portion 27 through a tube 23. The dust collection portion 27 is a filter-type or a cyclone-type dust collection device and separates fine particles from the air stream. A collection blower 28 is provided at a downstream side of the dust collection portion 27 and functions as a dust suction portion which sucks air from the dust collection portion 27. In addition, air discharged from the collection blower 28 is discharged outside of the sheet manufacturing apparatus 100 through a tube 29.

According to the sheet manufacturing apparatus 100, by the collection blower 28, air is sucked from the suction portion 48 through the dust collection portion 27. In the suction portion 48, fine particles passing through the meshes of the net of the mesh belt 46 are sucked together with air and are then fed to the dust collection portion 27 through the tube 23. In the dust collection portion 27, the fine particles passing through the mesh belt 46 are separated from the air stream and are then accumulated.

Hence, fibers obtained after the unnecessary materials are removed from the first sorted material are deposited on the mesh belt 46, and hence, the first web W1 is formed. Since the suction is performed by the collection blower 28, the formation of the first web W1 on the mesh belt 46 is promoted, and in addition, the unnecessary materials can be rapidly removed.

To a space including the drum portion 41, humidified air may be supplied by the humidifying portion 204. By this humidified air, the first sorted material is humidified in the sorting portion 40. Accordingly, the adhesion of the first sorted material to the mesh belt 46 caused by static electricity is suppressed, so that the first sorted material is likely to be peeled away from the mesh belt 46. Furthermore, the adhesion of the first sorted material to the rotation body 49 and the inner wall of the housing portion 43 caused by static electricity can be suppressed. In addition, by the suction portion 48, the unnecessary materials can be efficiently sucked.

In addition, in the sheet manufacturing apparatus 100, the structure in which the first sorted material and the second sorted material are sorted and separated is not limited to the sorting portion 40 including the drum portion 41. For example, the structure in which the defibrated material obtained by the defibrating treatment in the defibrating portion 20 is classified by a classifier may also be used. As the classifier, for example, a cyclone classifier, an elbow-jet classifier, or an eddy classifier may be used. When those classifiers are used, the first sorted material and the second sorted material can be sorted and separated. Furthermore, by the classifiers described above, the structure in which materials having a relatively small size and/or a low density, that is, the unnecessary materials, such as resin particles, coloring materials, and additives, which are not necessary for binding between the fibers, in the defibrated material are separated and removed therefrom can be realized. For example, the structure in which fine particles contained in the first sorted material are removed therefrom by a classifier may also be formed. In this case, the structure in which the second sorted material is returned, for example, to the defibrating portion 20, the unnecessary materials are collected by the dust collection portion 27, and the first sorted material other than the unnecessary materials is fed to a tube 54 may be formed.

In a transport path of the mesh belt 46, at a downstream side of the sorting portion 40, air containing mist may be supplied by the humidifying portion 210. The mist which is fine particles of water generated by the humidifying portion 210 falls down to the first web W1 and supplies moisture thereto. Accordingly, the moisture amount contained in the first web W1 is adjusted, and hence, for example, the adsorption of the fibers to the mesh belt 46 caused by static electricity can be suppressed.

The sheet manufacturing apparatus 100 includes the rotation body 49 which divides the first web W1 deposited on the mesh belt 46. The first web W1 is peeled away from the mesh belt 46 at a position at which the mesh belt 46 is folded by the roller 47 and is then divided by the rotation body 49.

The first web W1 is a soft material having a web shape formed by deposition of the fibers, the rotation body 49 disentangles the fibers of the first web W1, and hence, the first web W1 is likely to be mixed with a resin in the mixing portion 50 which will be described later.

Although the structure of the rotation body 49 is arbitrarily formed, in the example shown in the drawing, the rotation body 49 has a rotating blade shape having rotatable plate-shaped blades. The rotation body 49 is disposed at a position at which the first web W1 peeled away from the mesh belt 46 is brought into contact with the blade. By the rotation of the rotation body 49, such as the rotation in a direction indicated by an arrow R in the drawing, the first web W1 peeled away from and transported by the mesh belt 46 collides with the blade and is divided thereby, so that small parts P are produced.

In addition, the rotation body 49 is preferably placed at a position at which the blade of the rotation body 49 does not collide with the mesh belt 46. For example, the distance between a front end of the blade of the rotation body 49 and the mesh belt 46 can be set to be 0.05 to 0.5 mm, and in this case, without causing damage on the mesh belt 46, the first web W1 can be efficiently divided by the rotation body 49.

The small parts P divided by the rotation body 49 fall down in a tube 7 and are then transported to the mixing portion 50 by an air stream flowing inside the tube 7.

In addition, to a space including the rotation body 49, humidified air may be supplied by the humidifying portion 206. Accordingly, a phenomenon in which the fibers are adsorbed by static electricity to the inside of the tube 7 and the blades of the rotation body 49 can be suppressed. In addition, since air having a high humidity is supplied to the mixing portion 50 through the tube 7, influence caused by static electricity on the mixing portion 50 can also be suppressed.

The mixing portion 50 includes an additive supply portion 52 which supplies additives including the resin, the tube 54 which communicates with the tube 7 and through which an air stream containing the small parts P flows, and a mixing blower 56.

The small parts P are fibers obtained by removing the unnecessary materials from the first sorted material passing through the sorting portion 40 as described above. The mixing portion 50 mixes the additives including the resin with the fibers which form the small parts P.

In the mixing portion 50, an air stream is generated by the mixing blower 56, and the small parts P and the additives are transported in the tube 54 while being mixed together. In addition, the small parts P are disentangled in a process in which the small parts P flow inside the tube 7 and the tube 54, so that finer fibrous parts are formed.

The additive supply portion 52 is coupled to an additive cartridge (not shown) in which the additives are stored, and the additives in the additive cartridge are supplied to the tube 54. The additive cartridge may have a structure detachable to the additive supply portion 52. In addition, the additive supply portion 52 may have the structure in which the additives are replenished to the additive cartridge. The additive supply portion 52 temporarily stores the additives in the form of fine powders or fine particles in the additive cartridge. The additive supply portion 52 includes a discharge portion 52a which supplies the temporarily stored additives to the tube 54.

Although not shown in the drawing, the discharge portion 52a includes a feeder which feeds the additives stored in the additive supply portion 52 to the tube 54 and a shutter which opens and closes a path communicating between the feeder and the tube 54. When this shutter is closed, a path or an opening communicating between the discharge portion 52a and the tube 54 is closed, so that the supply of the additives from the additive supply portion 52 to the tube 54 is stopped.

In the state in which the feeder of the discharge portion 52a does not work, although the additives are not supplied from the discharge portion 52a to the tube 54, for example, when a reduced pressure is generated in the tube 54, even if the feeder of the discharge portion 52a is stopped, the additives may flow into the tube 54 in some cases. When the discharge portion 52a is closed, the flow of the additives as described above can be reliably stopped.

The additives supplied by the additive supply portion 52 include a resin which binds a plurality of fibers. The resin included in the additives may be a thermoplastic resin or a thermosetting resin, and for example, there may be mentioned an AS resin, an ABS resin, a polypropylene, a polyethylene, a poly(vinyl chloride), a polystyrene, an acrylic resin, a polyester resin, a poly(ethylene terephthalate), a poly(phenylene ether), a poly(butylene terephthalate), a polyamide, a polycarbonate, a polyacetal, a poly (phenylene sulfide), or a poly(ether ether ketone). Those resins mentioned above may be used alone, or at least two types thereof may be used in combination. That is, the additives each may contain either one single substance or a mixture and may contain a plurality of particles each formed of a single substance or a plurality of substances. In addition, the additives each may have either a fibrous shape or a powder shape.

The resin included in the additives is melted by heating so as to bind fibers together. Hence, in the state in which the resin and the fibers are mixed together, when the resin is not heated to a temperature at which melting thereof occurs, the fibers are not bound to each other.

In addition, besides the resin which binds the fibers together, for example, the additives supplied by the additive supply portion 52 may also include, in accordance with the type of sheet to be manufactured, a coloring agent which colors the fibers, an aggregation suppressor which suppresses aggregation of the fibers and aggregation of the resin, and/or a flame retardant agent which enables the fibers to be unlikely to be combusted. In addition, additives including no coloring agent may have a colorless color, a pale color which is regarded almost as a colorless color, or a white color.

By the air stream generated by the mixing blower 56, the small parts P falling down in the tube 7 and the additives supplied by the additive supply portion 52 are sucked in the tube 54 and are allowed to pass inside the mixing blower 56. By the air stream generated by the mixing blower 56 and the function of a rotation portion, such as a blade, of the mixing blower 56, the fibers forming the small parts P and the additives are mixed together, and the mixture thus formed, that is, a mixture of the first sorted material and the additives, is transported to the deposition portion 60 through the tube 54.

In addition, a mechanism in which the first sorted material and the additives are mixed together is not particularly limited and may be stirring which is performed by a blade rotatable at a high speed. In addition, rotation of a container, such as a V type mixer, may also be used, and those mechanisms each may be disposed at an upstream side or a downstream side of the mixing blower 56.

The deposition portion 60 deposits the defibrated material defibrated by the defibrating portion 20. In more particular, the deposition portion 60 introduces the mixture passing through the mixing portion 50 through an inlet port 62 and disentangles the defibrated material thus entangled, so that the defibrated material is allowed to fall down while being dispersed in air. Furthermore, when the resin of the additives supplied from the additive supply portion 52 has a fibrous shape, the deposition portion 60 disentangles the entangled resin. Accordingly, the deposition portion 60 can uniformly deposit the mixture in the second web forming portion 70.

The deposition portion 60 includes a drum portion 61 and a housing portion 63 receiving the drum portion 61. The drum portion 61 is a cylindrical sieve rotatably driven by a motor. The drum portion 61 has a net and functions as a sieve. By the meshes of this net, the drum portion 61 allows fibers and particles, each of which is smaller than the mesh opening of this net, to pass through and fall down from the drum portion 61. For example, the structure of the drum portion 61 is the same as that of the drum portion 41.

In addition, the "sieve" of the drum portion 61 may not have a function to sort a specific object. That is, the "sieve" to be used as the drum portion 61 indicates a member provided with a net, and the drum portion 61 may allows all of the mixture introduced thereinto to fall down.

Under the drum portion 61, the second web forming portion 70 is disposed. The second web forming portion 70 deposits a material passing through the deposition portion 60 to form a second web W2. The second web forming portion 70 includes, for example, a mesh belt 72, rollers 74, and a suction mechanism 76.

The mesh belt 72 is an endless belt, is suspended by the rollers 74, and by the movement of the rollers 74, is transported in a direction shown by an arrow in the drawing. The mesh belt 72 is formed, for example, of a metal, a resin, a cloth, or a non-woven cloth. The surface of the mesh belt 72 is formed of a net in which openings having a predetermined size are arranged. Of the fibers and particles which are allowed to fall down from the drum portion 61, fine particles having a size which are allowed to pass through the meshes of the net fall down to a lower side of the mesh belt 72, and fibers having a size which are not allowed to fall down through the meshes of the net are deposited on the mesh belt 72 and are transported therewith in the arrow direction. The mesh belt 72 is transferred at a predetermined velocity V2 during a normal operation for manufacturing of the sheet S. The "during the normal operation" indicates the same as described above.

The meshes of the net of the mesh belt 72 are fine and may be set so that most of the fibers and particles falling down from the drum portion 61 are not allowed to pass therethrough.

The suction mechanism 76 is provided at a lower side of the mesh belt 72. The suction mechanism 76 includes a suction blower 77, and by a suction force of the suction blower 77, an air stream toward a lower side can be generated in the suction mechanism 76.

By the suction mechanism 76, a mixture dispersed in air by the deposition portion 60 is sucked on the mesh belt 72. Accordingly, the formation of the second web W2 on the mesh belt 72 is promoted, and hence, a discharge rate from the deposition portion 60 can be increased. Furthermore, by the suction mechanism 76, a downflow can be formed in a falling path of the mixture, and hence, the defibrated material and the additives can be prevented from being entangled with each other during the falling.

The suction blower 77 may discharge air sucked from the suction mechanism 76 outside of the sheet manufacturing apparatus 100 through a collection filter (not shown). Alternatively, air sucked by the suction blower 77 may be fed to the dust collection portion 27 so that unnecessary materials contained in the air sucked by the suction mechanism 76 may be collected.

To a space including the drum portion 61, humidified air is supplied by the humidifying portion 208. By this humidified air, the inside of the deposition portion 60 can be humidified, and the adhesion of fibers and particles to the housing portion 63 caused by static electricity is suppressed, so that the fibers and particles are allowed to rapidly fall down on the mesh belt 72, and the second web W2 can be formed to have a preferable shape.

As described above, through the deposition portion 60 and the second web forming portion 70, the second web W2 can be formed so as to be softly expanded with a large amount of air incorporated therein. The second web W2 deposited on the mesh belt 72 is transported to the sheet forming portion 80.

In a transport path of the mesh belt 72, at a downstream side of the deposition portion 60, by the humidifying portion 212, air containing mist may be supplied. Accordingly, the mist generated by the humidifying portion 212 is supplied to the second web W2, so that the content of moisture contained in the second web W2 is adjusted. Accordingly, for example, the adsorption of fibers to the mesh belt 72 caused by static electricity can be suppressed.

The sheet manufacturing apparatus 100 includes the transport portion 79 which transports the second web W2 on the mesh belt 72 to the sheet forming portion 80. The transport portion 79 includes, for example, a mesh belt 79a, rollers 79b, and a suction mechanism 79c.

The suction mechanism 79c includes a blower not shown, and by a suction force of the blower, an upward air stream is generated to the mesh belt 79a. This air stream sucks the second web W2, and the second web W2 is separated from the mesh belt 72 and then adsorbed to the mesh belt 79a. The mesh belt 79a is transferred by the rotations of the rollers 79b, so that the second web W2 is transported to the sheet forming portion 80. The transfer rate of the mesh belt 72 is the same, for example, as the transfer rate of the mesh belt 79a.

As described above, the transport portion 79 peels away the second web W2 formed on the mesh belt 72 therefrom and then transports the second web W2 thus peeled away.

The sheet forming portion 80 forms the sheet S from a deposit deposited in the deposition portion 60. In more particular, the sheet forming portion 80 forms the sheet S by heating and pressurizing the second web W2 which is deposited on the mesh belt 72 and is then transported by the transport portion 79. The sheet forming portion 80 binds a plurality of fibers in the mixture to each other with the resin interposed therebetween by heating the fibers of the defibrated material and the additives contained in the second web W2.

The sheet forming portion 80 includes a pressure application portion 82 which pressurizes the second web W2 and a heating portion 84 which heats the second web W2 pressurized by the pressure application portion 82.

The pressure application portion 82 is formed of a pair of calendar rollers 85 which sandwich the second web W2 at a predetermined nip pressure for pressure application. Since the second web W2 is pressurized, the thickness thereof is decreased, and hence, the density of the second web W2 is increased. One of the pair of calendar rollers 85 is a drive roller driven by a motor not shown in the drawing, and the other roller is a driven roller. The calendar rollers 85 are rotated by a driving force of the motor, and the second web W2, the density of which is increased by the pressure application, is transported toward the heating portion 84.

The heating portion 84 is formed, for example, using heating rollers, a heat press forming machine, a hot plate, a hot-wind blower, an infrared heater, or a flash fixing device. In the example shown in the drawing, the heating portion 84 includes a pair of heating rollers 86. The heating rollers 86 are heated to a predetermined temperature by a heater disposed inside or outside. The heating rollers 86 sandwich the second web W2 pressurized by the calendar rollers 85 for heating, so that the sheet S is formed.

One of the pair of heating rollers 86 is a drive roller driven by a motor not shown in the drawing, and the other roller is a driven roller. The heating rollers 86 are rotated by a driving force of the motor, so that the sheet S thus heated is transported toward the cutting portion 90.

As described above, the second web W2 formed in the deposition portion 60 is pressurized and heated in the sheet forming portion 80, so that the sheet S is formed.

In addition, the number of the calendar rollers 85 of the pressure application portion 82 and the number of the heating rollers 86 of the heating portion 84 are not particularly limited.

The cutting portion 90 cuts the sheet S formed in the sheet forming portion 80. In the example shown in the drawing, the cutting portion 90 includes a first cutting portion 92 which cuts the sheet S in a direction intersecting a transport direction of the sheet S and a second cutting portion 94 which cuts the sheet S in a direction parallel to the transport direction. The second cutting portion 94 cuts, for example, the sheet S which passes through the first cutting portion 92.

As described above, a single sheet S having a predetermined size is formed. The single sheet S thus cut is discharged to a discharge portion 96. The discharge portion 96 includes a tray or a stacker on each of which sheets S each having a predetermined size are placed.

In addition, although not shown in the drawing, the humidifying portions 202, 204, 206, and 208 may be formed from one vaporization type humidifier. In this case, the structure may be formed so that humidified air generated by one humidifier is branched and supplied to the coarsely pulverizing portion 12, the housing portion 43, the tube 7, and the housing portion 63. When a duct which supplies humidified air is branched and then installed, the structure described above can be easily realized. In addition, the humidifying portions 202, 204, 206, and 208 may also be formed from two or three vaporization type humidifiers.

In addition, the humidifying portions 210 and 212 may be formed from one ultrasonic type humidifier or may be formed from two ultrasonic type humidifiers. For example, air containing mist generated by one humidifier may be configured to be branched and supplied to the humidifying portions 210 and 212.

In addition, as described above, although the coarsely pulverizing portion 12 pulverizes the raw material, and the sheet S is manufactured from the pulverized raw material, for example, the structure may also be formed so that fibers are used as the raw material, and the sheet S is manufactured therefrom.

For example, the structure may also be formed so that as the raw material, fibers equivalent to the defibrated material obtained by the defibrating treatment performed in the defibrating portion 20 are charged in the drum portion 41. In addition, the structure may also be formed so that as the raw material, fibers equivalent to the first sorted material separated from the defibrated material is charged to the tube 54. In the case described above, when fibers obtained by processing of waste paper, pulp, and the like is supplied to the sheet manufacturing apparatus 100, the sheet S can be manufactured.

2. Defibrating Device

Figure 2:
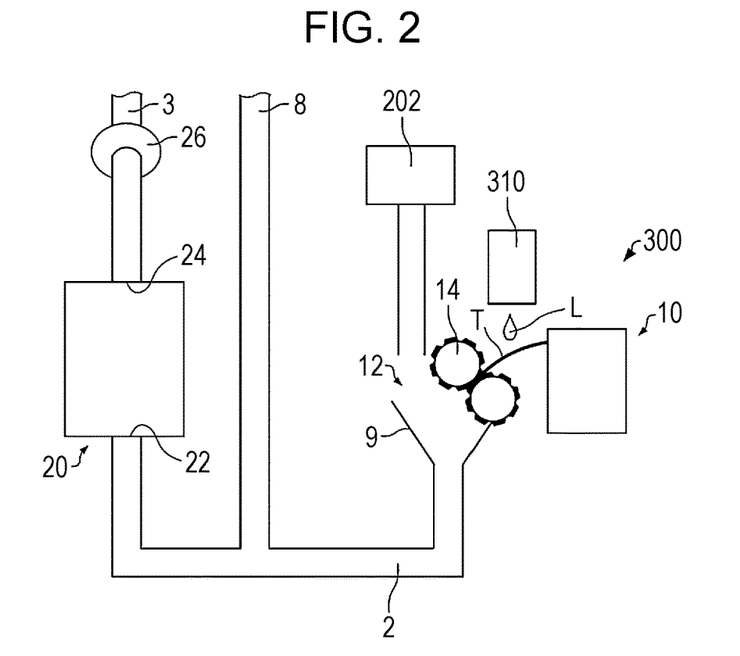
FIG. 2 is a schematic view showing a defibrating device according to this embodiment.

Next, a defibrating device according to this embodiment will be described with reference to the attached drawing. FIG. 2 is a schematic view showing a defibrating device 300 according to this embodiment.

As shown in FIG. 2, the defibrating device 300 includes, for example, a liquid supply portion 310, the supply portion 10, the coarsely pulverizing portion 12, and the defibrating portion 20. The sheet manufacturing apparatus 100 described above includes the defibrating device 300. In addition, for the convenience of illustration, in FIG. 1, the liquid supply portion 310 is omitted.

As shown in FIG. 2, the liquid supply portion 310 supplies a liquid L to a fiber body T containing fibers. The fiber body T is, for example, a raw material manufacturing the sheet S shown in FIG. 1. The fiber body T is a sheet or coarsely pulverized pieces formed from the sheet. In the example shown in FIG. 2, the fiber body T is a sheet. The liquid supply portion 310 supplies the liquid L, for example, by an ink jet application method, a spray application method, or a roller application method. When the liquid L is supplied by an ink jet application method, the liquid supply portion 310 is an ink jet application unit, and in this case, the liquid supply portion 310 may be a line head type having a width larger than the width of the fiber body T used as the sheet. Accordingly, the productivity can be improved. In addition, when the liquid L is supplied by a spray application method, the liquid supply portion 310 is a spray application unit.

The liquid L may contain water and a moisturizer. When the liquid L contains a moisturizer, a moisture retention effect of the liquid L can be enhanced. In addition, since water is applied to the fiber body T, at positions at which hydrogen bonds between fibers are loosened, —OH groups of the moisturizer which intrudes in the fiber body T may form hydrogen bonds with "H groups of the fibers. Hence, the hydrogen bonds between the fibers are weakened, and as a result, the fiber body T can be easily defibrated.

As the moisturizer contained in the liquid L, for example, there may be mentioned diethylene glycol, triethylene glycol, propylene glycol, dipropylene glycol, 1,3-propanediol, 1,3-butylene glycol, 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-propanediol, 1,2-hexanediol, 2-ethyl-1,3-hexanediol, 3-methyl-1,5-penetandiol, 2-methylpenetane-2,4-diol, trimethylolpropane, or glycerin. In addition, the moisturizer contained in the liquid L is not particularly limited as long as a solvent having a moisture absorbing property is used, and for example, a diol or a polyol, each of which has at least two hydroxyl groups, may be mentioned. Furthermore, as the moisturizer contained in the liquid L, glycerin or propylene glycol, each of which is a solvent having a moisture content of 1% or more (that is, moisture content in 100 g of a solvent is 1 g or more) in an environment at a temperature of 23° C. and a relative humidity of 50%, is preferable.

The amount of the moisturizer contained in the liquid L with respect to the total mass of the liquid L is, for example, 5 to 50 percent by mass and preferably 15 to 50 percent by mass. When the amount of the moisturizer contained in the liquid L is in the range described above, the moisture retention effect of the liquid L can be enhanced.

The rate of the mass of the moisturizer to the mass of the fiber body T to which the liquid L is supplied is, for example, 4.7% to 20.2%. When the rate is in the range described above, the defibration can be efficiently performed by the defibrating portion 20. In addition, the "mass of the fiber body T to which the liquid L is supplied" indicates the total of the mass of the fiber body T and the mass of the liquid L supplied to the fiber body T.

As the water contained in the liquid L, purified water or ultra purified water, such as ion-exchanged water, ultrafiltrated water, reverse osmosis water, or distilled water, is preferably used. In addition, water sterilized by UV irradiation or addition of hydrogen peroxide is preferable since the generation of fungi and/or bacterial can be prevented, and long storage can be performed.

The liquid L may contain a surface tension controller. Since the liquid L contains a surface tension controller, the water and the moisturizer can be easily infiltrated deeply in the fiber body T.

As the surface tension controller contained in the liquid L, for example, there may be mentioned a glycol ether, such as triethylene glycol monobutyl ether, triethylene glycol dimethyl ether, triethylene glycol diethyl ether, triethylene glycol dibutyl ether, or triethylene glycol methyl butyl ether; a silicone-based surfactant, an acetylene glycol-based surfactant, an acetylene alcohol-based surfactant, or a fluorine-based surfactant. As the surfactant mentioned above, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D, manufactured by Air Products and Chemicals, Inc.; Olefin B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3, manufactured by Nisshin Chemical Industry Co., Ltd.; or Acetynol E00, E00P, E40, or E100, manufactured by Kawaken Fine Chemicals Co., Ltd. The content of the surface tension controller with respect to the liquid L is preferably 0.01 to 30 percent by mass, more preferably 0.1 to 20 percent by mass, and further preferably 1 to 20 percent by mass. When the content is in the range described above, the liquid L can be easily infiltrated deeply in the fiber body T. In addition, among the moisturizers mentioned above, in particular, an alkanediol also has a function as the surface tension controller.

The surface tension of the liquid L at 20° C. is preferably 50 mN/m or less and more preferably 40 mN/m or less. When the surface tension is in the range described above, the liquid L can be easily infiltrated deeply in the fiber body T.

As other additives to be contained in the liquid L, for example, there may be mentioned an UV absorber, a light stabilizer, a quencher, an antioxidant, a water resistant agent, a fungicide, an antiseptic agent, a thickening agent, a flow modifier, a pH adjuster, a defoaming agent, an antifoam agent, a leveling agent, and/or a antistatic agent.

The liquid supply portion 310 supplies the liquid L, for example, to the fiber body T before coarsely pulverized by the coarsely pulverizing portion 12. The coarsely pulverizing portion 12 coarsely pulverizes the fiber body T to which the liquid L is supplied.

The defibrating portion 20 defibrates the fiber body T to which the liquid L is supplied. In the example shown in the drawing, the defibrating portion 20 defibrates the coarsely pulverized fiber body T. The defibrating portion 20 defibrates the fiber body T, for example, within one hour or preferably within 10 minutes after the supply of the liquid L to the fiber body T.

The liquid supply portion 310 supplies the liquid L to the fiber body T so that a rate R in tensile strength of the fiber body T immediately before defibrated by the defibrating portion 20 to the fiber body T before the liquid L is supplied thereto is, for example, 60.0% or less, preferably 4% to 58%, and more preferably 6% to 11%. In other words, the liquid supply portion 310 supplies the liquid L to the fiber body T so that the rate R of the tensile strength of the fiber body T immediately before defibrated by the defibrating portion 20 to the tensile strength of the fiber body T before the liquid L is supplied thereto is, for example, 60.0% or less, preferably 4% to 58%, and more preferably 6% to 11%. In addition, the tensile strength of the fiber body T may be appropriately adjusted by drying the fiber body T. In addition, "immediately before" indicates within one second, and for example, "fiber body T immediately before defibrated by the defibrating portion 20" indicates the fiber body T which is to be defibrated by the defibrating portion 20 within one second.

The liquid supply portion 310 supplies the liquid L to the fiber body T so that the moisture content of the fiber body T immediately before defibrated by the defibrating portion 20 is, for example, 13.5% to 45.1% and preferably 20.8% to 41.2%. In addition, when the moisture content of the fiber body T immediately before defibrated is excessive, the moisture content of the fiber body T may be adjusted by drying the fiber body T.

In addition, the "moisture content of the fiber body T" is obtained by the following formula. The moisture content of the present disclosure is a moisture content measured in an environment at a temperature of 23° C. and a relative humidity of 50%.

Moisture Content of Fiber Body $T$ [%]=(mass of moisture contained in fiber body $T$)/(mass of fiber body $T$ containing moisture)×100

As one example, the amount of the liquid L supplied to an A4-size sheet (recycled sheet "G80", recycle cut type G-80, manufactured by Mitsubishi Paper Mills Limited) exposed in an environment at a temperature of 23° C. and a relative humidity of 50% is 0.7 to 3.3 g and preferably 1.3 to 3.0 g. Based on the information on the type, the thickness, and the size of the fiber body T before the liquid L is supplied thereto and the environment to which the fiber body T is exposed, the amount of the liquid L to be supplied may be determined. In addition, after the liquid L is supplied to the fiber body T, the moisture content of the fiber body T is measured by a moisture meter, and when the moisture content of the fiber body T is in a predetermined range, the fiber body T is supplied to the defibrating portion 20. On the other hand, when the moisture content of the fiber body T is not in the predetermined range, the fiber body T is not supplied to the defibrating portion 20 and is separately stored in a different receiving portion.

The defibrating device 300 has the following features.

The defibrating device 300 includes the liquid supply portion 310 supplying the liquid L to the fiber body T and the defibrating portion 20 defibrating the fiber body T to which the liquid L is supplied, and the liquid supply portion 310 supplies the liquid L to the fiber body T so that the rate R in tensile strength of the fiber body T immediately before defibrated by the defibrating portion 20 to the fiber body T before the liquid is supplied thereto is 60.0% or less. Hence, by the defibrating device 300, compared to the case in which the rate R is larger than 60.0%, as shown below in "4. Examples and Comparative Examples", the defibration can be efficiently performed. Hence, the defibrating device 300 can save energy.

Furthermore, the defibrating device 300 can suppress the defibrated material defibrated by the defibrating portion 20 from being electrically charged. Hence, for example, the tube 3 which transports the defibrated material is suppressed from being clogged, and the uniformity of the basis weight of the sheet S to be manufactured can be suppressed from being degraded.

Furthermore, since the liquid L is supplied to the fiber body T, the defibrating device 300 can suppress the generation of heat in the defibrating portion 20. For example, the liquid L may contain ethanol, and since the heat of the defibrating portion 20 is taken out when ethanol is evaporated, the defibrating portion 20 may be cooled.

In the defibrating device 300, the liquid supply portion 310 supplies the liquid L to the fiber body T so that the moisture content of the fiber body T immediately before defibrated by the defibrating portion 20 is 13.5% to 45.1%. When the above moisture content is in the range described above, as shown below in "4. Examples and Comparative Examples", the defibrating portion 20 can efficiently perform the defibration.

In the defibrating device 300, the liquid supply portion 310 may supply the liquid L to the fiber body T so that the moisture content of the fiber body T immediately before defibrated by the defibrating portion 20 is 20.8% to 41.2%. When the above moisture content is in the range described above, as shown below in "4. Examples and Comparative Examples", the defibrating portion 20 can efficiently perform the defibration and can further suppress the fibers from being entangled with each other.

In the defibrating device 300, the liquid L may contain water and a moisturizer. Accordingly, compared to the case in which the liquid L contains no moisturizer, the moisture retention effect of the liquid L can be enhanced.

In the defibrating device 300, the rate of the mass of the moisturizer to the mass of the fiber body T to which the liquid L is supplied may be 4.7% to 20.2%. When the above rate is in the range described above, as shown below in "4. Examples and Comparative Examples", the defibrating portion 20 can efficiently perform the defibration.

In the defibrating device 300, the fiber body T is a sheet, the coarsely pulverizing portion 12 coarsely pulverizing the fiber body T to which the liquid L is supplied is included, and the defibrating portion 20 may defibrate the coarsely pulverized fiber body T. Hence, compared to the case in which the liquid L is supplied after the fiber body T is coarsely pulverized by the coarsely pulverizing portion 12, the defibrating device 300 can suppress the variation in rate of the mass of the liquid L to the mass of the fiber body T.

Figure 3:
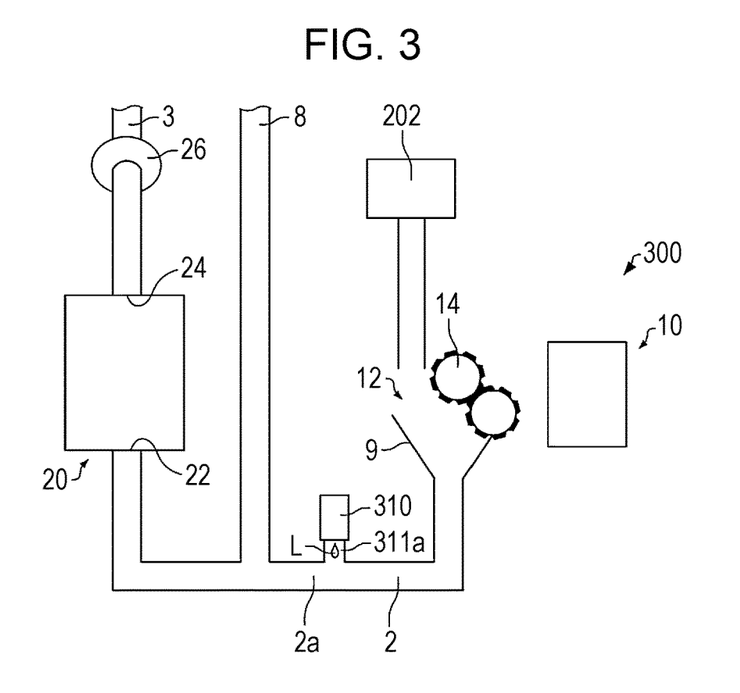
FIG. 3 is a schematic view showing a defibrating device according to this embodiment.

In addition, as shown in FIG. 3, the liquid supply portion 310 may supply the liquid L to a fiber body coarsely pulverized by the coarsely pulverizing portion 12. In the example shown in FIG. 3, the liquid supply portion 310 is disposed so as to supply the liquid L to a fiber body passing through a first portion 2a of the tube 2. The first portion 2a is a portion of the tube 2 which couples the tube 8 to the shoot 9. In the example shown in the drawing, the liquid supply portion 310 and the first portion 2a are coupled to each other by a tube 311a.

Figure 4:
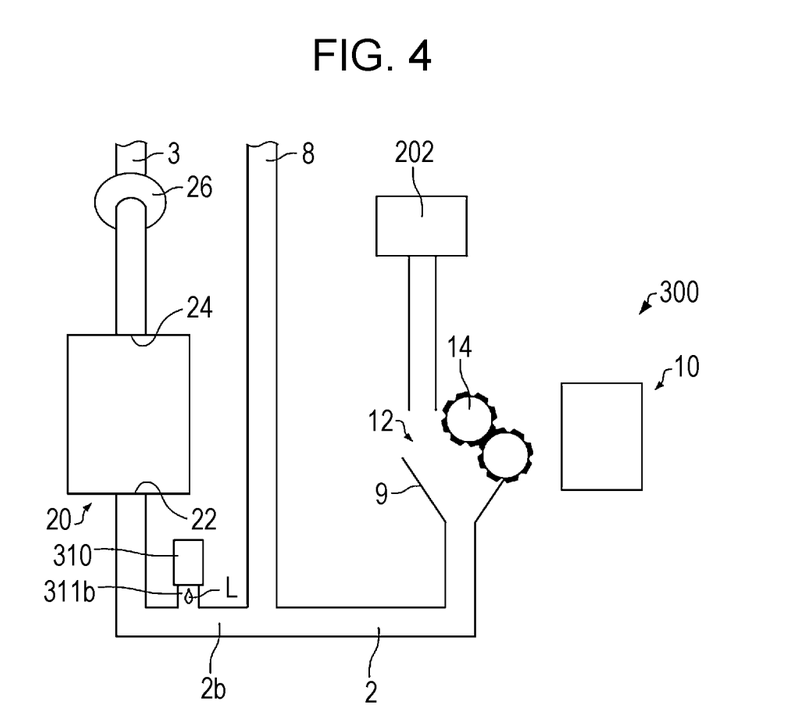
FIG. 4 is a schematic view showing a defibrating device according to this embodiment.

In addition, as shown in FIG. 4, the liquid supply portion 310 may be disposed so as to supply the liquid L to a fiber body passing through a second portion 2b of the tube 2. The second portion 2b is a portion of the tube 2 which couples the tube 8 to the defibrating portion 20. In the case described above, the liquid supply portion 310 supplies the liquid L to a mixture of the second sorted material passing through the tube 8 and the coarsely pulverized pieces not passing through the tube 8. Since the second sorted material passes through the defibrating portion 20 once, the amount of moisture may be decreased in some cases due to the heat of the defibrating portion 20. Hence, when the liquid supply portion 310 is disposed to supply the liquid L to the fiber body passing through the second portion 2b of the tube 2, the amount of moisture of the second sorted material can be increased. In the example shown in the drawing, the liquid supply portion 310 and the second portion 2b are coupled to each other by a tube 311b.

3. Method for Defibrating Fiber Body and Sheet Manufacturing Method

Figure 5:
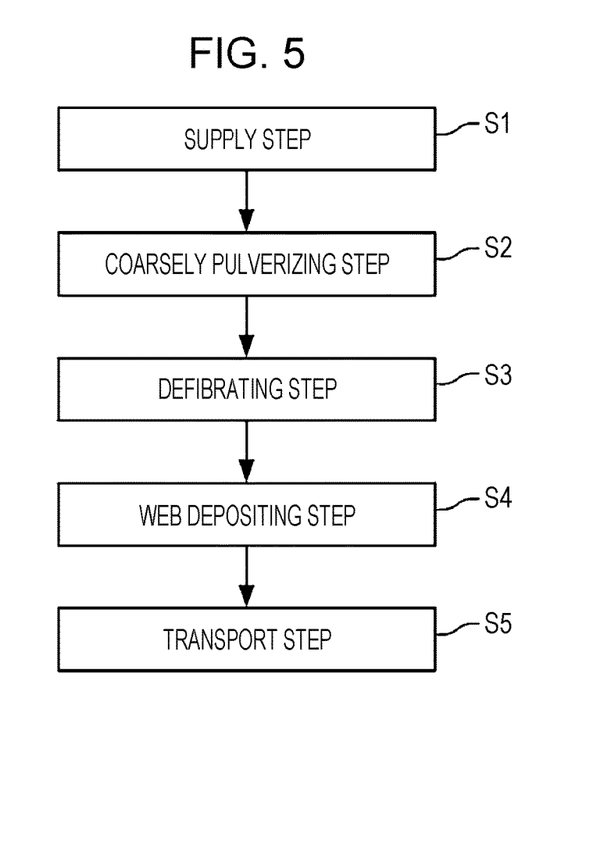
FIG. 5 is a flowchart illustrating a sheet manufacturing method according to this embodiment.

Next, a method for defibrating a fiber body and a sheet manufacturing method according to this embodiment will be described with reference to the drawing. The sheet manufacturing method according to this embodiment includes the method for defibrating a fiber body according to this embodiment. FIG. 5 is a flowchart illustrating the sheet manufacturing method according to this embodiment. The sheet manufacturing method according to this embodiment uses, for example, the sheet manufacturing apparatus 100 which includes the defibrating device 300 shown in FIG. 2.

As shown in FIG. 5, the sheet manufacturing method according to this embodiment includes a supply step (Step S1) of supplying the liquid L to the fiber body T, a coarsely pulverizing step (Step S2) coarsely pulverizing the fiber body T to which the liquid L is supplied in the supply step, a defibrating step (Step S3) defibrating the fiber body T coarsely pulverized in the coarsely pulverizing step to form a defibrated material, a web depositing step (Step S4) depositing the defibrated material to form the second web W2, and a transport step (Step S5) transporting the web W2. In addition, the sheet manufacturing method according to this embodiment may also include the steps described in "1. Sheet Manufacturing Apparatus" and the like.

According to the sheet manufacturing method of this embodiment, in the supply step, the liquid L is supplied to the fiber body T so that the rate in tensile strength of the fiber body T immediately before defibrated in the defibrating step to the fiber body T before the liquid L is supplied thereto is, for example, 60.0% or less. Furthermore, in the supply step, the liquid L is supplied to the fiber body T so that the moisture content of the fiber body immediately before defibrated in the defibrating step is, for example, 13.5% to 45.1% and preferably 20.8% to 41.2%. In addition, the defibrating method according to this embodiment includes Steps S1 and S2.

In addition, in the sheet manufacturing apparatus 100 shown in FIG. 1, the deposition portion 60 produces the second web W2 by depositing the defibrated material. The second web forming portion 70 is a transport portion transporting the second web W2.

4. Examples and Comparative Examples

Hereinafter, with reference to Examples and Comparative Examples, the present disclosure will be described in more detail. In addition, the present disclosure is not limited to the following Examples and Comparative Examples.

4.1. Evaluation of Liquid Composition

Figure 6:
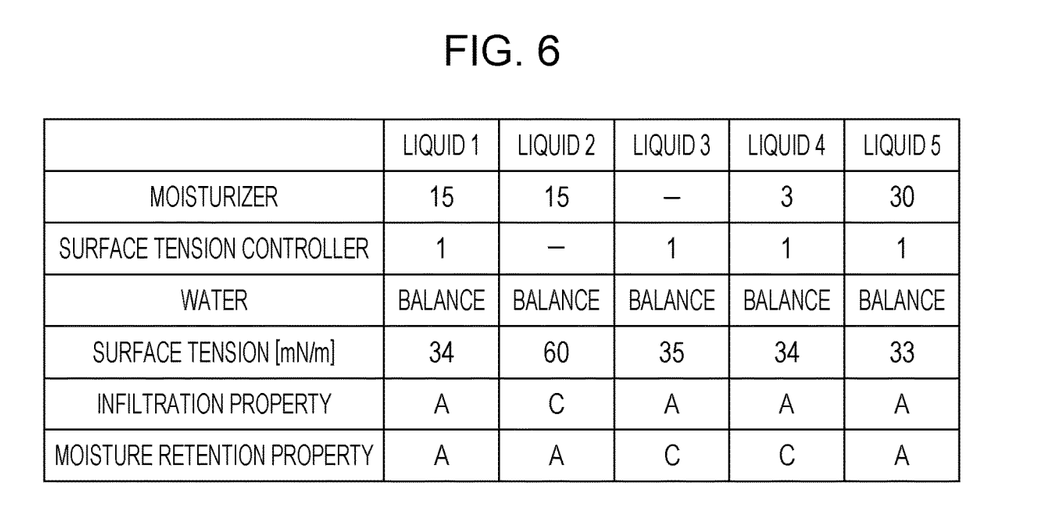
FIG. 6 is a table showing compositions of liquids 1 to 5.

FIG. 6 is a table showing compositions of liquids 1 to 5 to be used as the liquid L. In FIG. 6, the unit indicates percent by mass. As the moisturizer, glycerin was used. As the surface tension controller, Olefin E1010 (manufactured by Nisshin Chemical Industry Co., Ltd.) was used. With the balance being water, the total was set to 100 percent by mass.

The surface tension of each of the liquids 1 to 5 was measured. For the measurement of the surface tension, an automatic surface tension meter "CBVP-Z" manufactured by Kyowa Interface Science Co., Ltd. was used. The surface tension was measured when a platinum plate was wetted with each of the liquids 1 to 5 in an environment at 20° C.

Furthermore, an infiltration property and a moisture retention property of each of the liquids 1 to 5 were evaluated. As the infiltration property, a contact angle between each of the liquid 1 to 5 and recycled paper "G80" (recycle cut type G-80, manufactured by Mitsubishi Paper Mills Limited) having a basis weight of 64 g/m² was observed, and a time until the contact angle was changed to 20° or less was measured for the evaluation. The contact angle was measured using a contact angle meter "PCA-11" manufactured by Kyowa Interface Science Co., Ltd.

The evaluation criteria of the infiltration property are as follows.
A: 500 ms or less
B: more than 500 ms to 2,000 ms
C: more than 2,000 ms As the moisture retention property, within 5 minutes after 1 g of each of the liquids 1 to 5 was applied to recycled paper "G80", a first moisture content was measured, and a second moisture content was also measured one hour after the application of the liquid described above, so that the rate of change between the first and the second moisture contents was evaluated. The moisture content was measured using a heat drying type moisture meter "ML-50" manufactured by A&D Company, Limited. The moisture content was measured in an environment at a temperature of 23° C. and a relative humidity of 50%. The rate of change was calculated by the following formula.

Rate of Change [%]=(1−(first moisture content)/(second moisture content)×100

The evaluation criteria of the infiltration property are as follows.
A: less than 20%
B: 20% to less than 50%
C: 50% or more As shown in FIG. 6, the liquid 3 containing no moisturizer and the liquid 4 containing 3 percent by mass of the moisturizer each have an inferior moisture retention property. It is found that when 15 percent by mass or more of the moisturizer is contained, the moisture retention property is improved. In addition, it is found that when the surface tension controller is contained, the infiltration property is improved.

4.2. Evaluation of Rate in Tensile Strength

Figure 7:
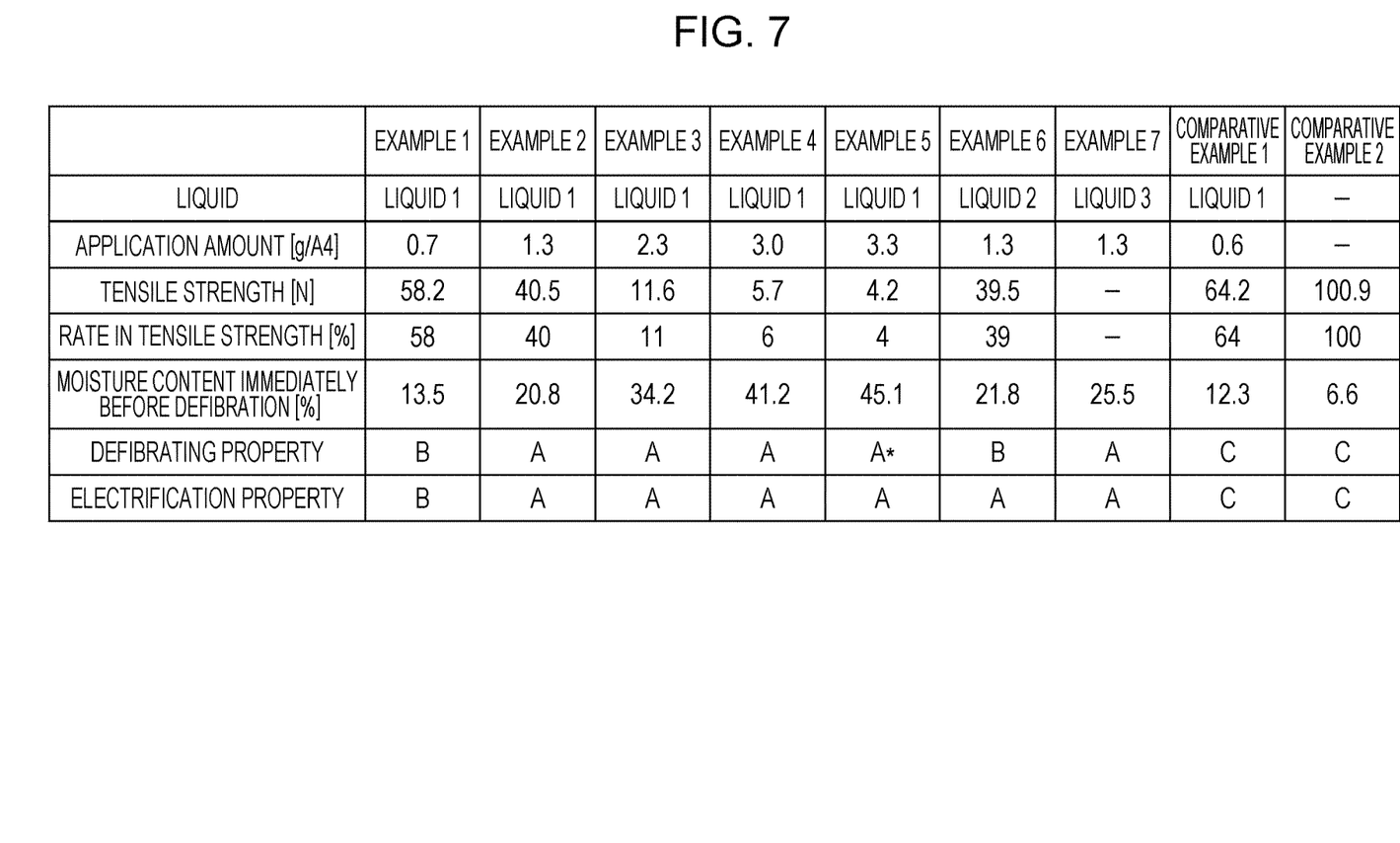
FIG. 7 is a table showing a defibrating property and an electrification property of a sheet of each of Examples 1 to 7 and Comparative Examples 1 and 2.

The rate in tensile strength of each of Examples 1 to 7 and Comparative Examples 1 and 2 was evaluated. In particular, the rate in tensile strength of the sheet was changed by changing the application amount of the liquid 1 and by applying the liquids 2 and 3 instead of applying the liquid 1, and a defibrating property and an electrification property were evaluated. FIG. 7 is a table showing the defibrating property and the electrification property of each of Examples 1 to 7 and Comparative Examples 1 and 2. In addition, in Comparative Example 2, the liquids 1 to 3 were not supplied to the sheet.

The rate in tensile strength was obtained as described below. After a predetermined amount of each of the liquids 1 to 3 was applied to recycled paper "G80" having a basis weight of 64 g/m² using an ink jet printer "PX-S160T" manufactured by Seiko Epson Corporation, by using a heat press machine, heat drying was performed at 150° C. and 10 kN for 30 seconds, so that a sheet was formed. Subsequently, after the sheet was cut into a size having a width of 25 mm and a length of 180 mm, by using a desktop precision universal tester "AGS-X 500N" manufactured by Shimadzu Corporation, the tensile strength was measured at an elongation rate of 20 mm/min. The measurement was performed 10 minutes after each of the liquids 1 to 3 shown in FIG. 6 was applied. The tensile strength of the recycled paper "G80" before each of the liquids 1 to 3 was applied was 100.9 N. The rate in tensile strength was calculated by the following formula.

Rate in tensile strength [%]=(tensile strength after liquid is applied [N])/(tensile strength before liquid is applied [N])×100

The defibrating property was evaluated as described below. A predetermined amount of each of the liquids 1 to 3 was applied to recycled paper "G80" having a basis weight of 64 g/m² and a size of 100 mm by 50 mm using an ink jet printer "PX-S160T". Next, after the recycled paper "G80" to which the liquid was applied was cut into pieces each having a size of 10 mm square by a pair of scissors, defibration was performed at 10,500 rpm for 30 seconds using a food processor "BM-RT08" manufactured by Zojirushi Corporation, so that a defibrated sample was formed.

Next, after a sieve having a mesh size of 1.4 mm was fitted to a sieve shaking machine "A200" manufactured by Retsch, the defibrated sample was classified thereby for 5 minutes. In addition, the defibration rate was calculated by the following formula.

Defibration Rate [%]=(mass of fibers passing through sieve [g])/(total mass of defibrated sample charged to sieve shaking machine [g])×100

The evaluation criteria of the defibrating property are as follows.
A: Defibration rate of 20% to less than 34%
B: Defibration rate of 14% to less than 20%
C: Defibration rate of less than 14%
A*: Although the defibration is sufficiently performed, fibers are entangled with each other and are not allowed to pass through the sieve.

For the electrification property, the amount of fibers adhered to a metal blade of the food processor after the defibration was observed by visual inspection.

The evaluation criteria of the electrification property are as follows.
A: Fibers are hardly adhered to the metal blade.
B: Fibers are slightly adhered to the metal blade.
C: Fibers are significantly adhered to the metal blade.

Furthermore, in FIG. 7, the moisture content of the recycled paper "G80" immediately before defibrated is shown. The moisture content is measured in the environment described above using the above heat drying type moisture meter. In addition, the application amount shown in FIG. 7 is the mass of each of the liquids 1 to 3 per A4 size.

As shown in FIG. 7, when the rate in tensile strength is 60.0% or less, compared to the case in which the rate in tensile strength is more than 60.0%, the defibrating property and the electrification property are superior. It is found that when the rate in tensile strength is 60.0% or less, the defibration can be efficiently performed. In addition, it is also found that the defibration can be efficiently performed when the moisture content immediately before the defibration is in a range of 13.5% to 45.1%, and that the fibers are suppressed from being entangled with each other when the moisture content is in a range of 20.8% to 41.2%.

In addition, when the recycled paper "G80" was left for 10 days at a temperature of 40° C. and a relative humidity of 80%, the moisture content was 10.8%, and the defibration was not efficiently performed.

4.3. Evaluation of Effective Tim after Liquid Application

Figure 8:
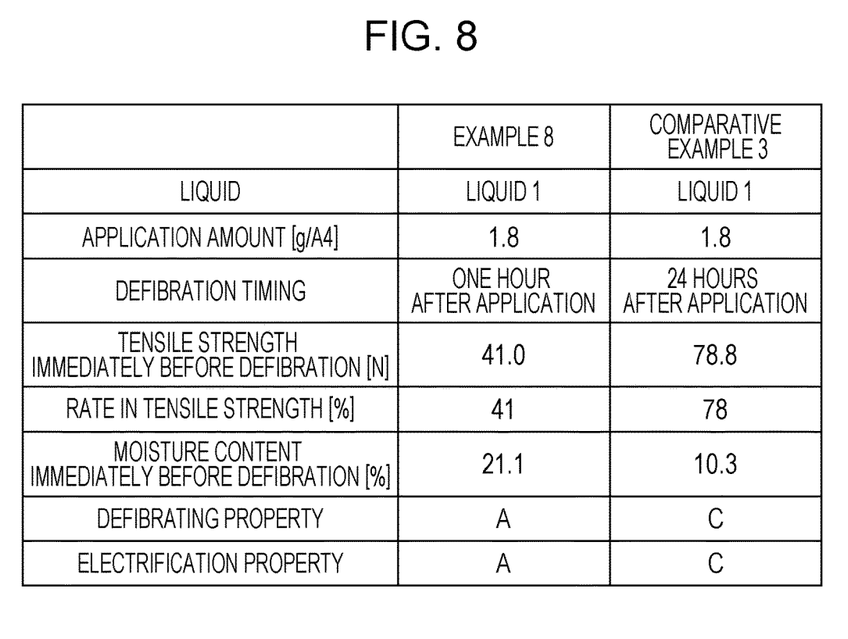
FIG. 8 is a table showing the defibrating property and the electrification property of a sheet of each of Example 8 and Comparative Example 3.

An effective time after the liquid was applied was evaluated using a sheet of each of Example 8 and Comparative Example 3. In particular, after the liquid was applied, the time until the defibration was performed was set to one hour and 24 hours, and the defibrating property and the electrification property were evaluated. FIG. 8 is a table showing the defibrating property and the electrification property of the sheet of each of Example 8 and Comparative Example 3.

The defibrating property and the electrification property were evaluated by an evaluation method and evaluation criteria similar to those described in "4.2. Evaluation of Rate in Tensile Strength".

As shown in FIG. 8, in Example 8 in which the defibration is performed one hour after the liquid 1 is applied, although the defibrating property and the electrification property are superior, in Comparative Example 3 in which the defibration is performed 24 hours after the liquid application, the defibrating property and the electrification property are inferior.

4.4. Evaluation of Content of Moisturizer

Figure 9:
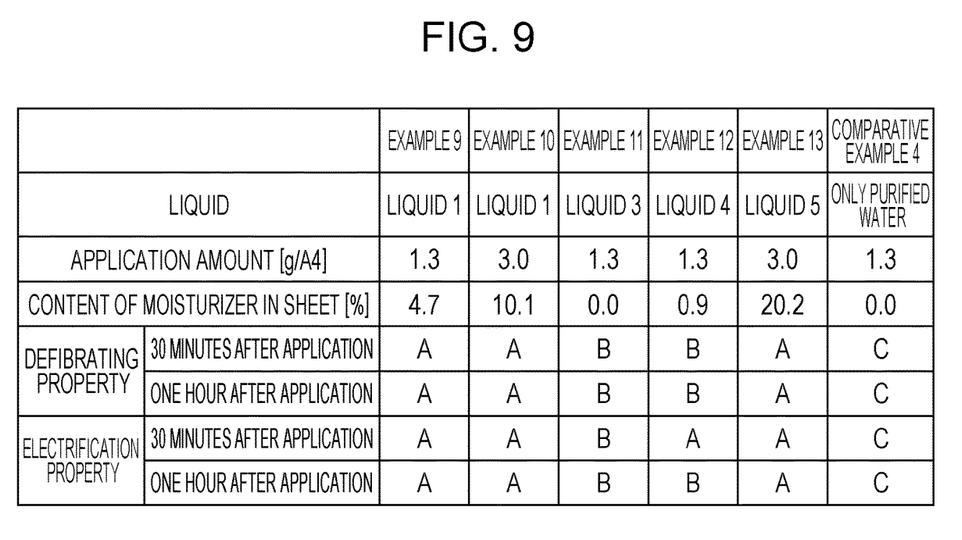
FIG. 9 is a table showing the defibrating property and the electrification property of a sheet of each of Examples 9 to 13 and Comparative Example 4.

The content of the moisturizer of a sheet of each of Examples 9 to 13 and Comparative Example 4 was evaluated. In particular, the mass of the moisturizer with respect to the mass of the sheet to which the liquid was applied, that is, the content of the moisturizer in the sheet, was changed by changing the application amount of the liquid 1 and by applying the liquids 3 to 5 and purified water instead of applying the liquid 1, and the defibrating property and the electrification property were evaluated. FIG. 9 is a table showing the defibrating property and the electrification property of the sheet of each of Examples 9 to 13 and Comparative Example 4.

The defibrating property and the electrification property were evaluated by an evaluation method and evaluation criteria similar to those described in "4.2. Evaluation of Rate in Tensile Strength". In addition, a material which was defibrated 30 minutes after the application of the liquid and a material which was defibrated one hour after the application of the liquid were evaluated.

As shown in FIG. 9, when the content of the moisturizer in the sheet is 4.7% to 20.2%, the defibrating property and the electrification property are superior.

In the present disclosure, within the range in which the features and the advantages described in the present disclosure are obtained, the structure may be partially omitted, or the embodiments and the modified examples may be arbitrarily used in combination.

The present disclosure is not limited to the embodiments described above and may be variously changed or modified. For example, the present disclosure includes substantially the same structure as the structure described in the embodiment. The substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A method for defibrating a fiber body, the method comprising:
    a supply step of supplying a liquid containing water and a moisturizer to a fiber body containing fibers; and
    a defibrating step of defibrating the fiber body to which the liquid is supplied, wherein
    in the supply step, the liquid is supplied to the fiber body so that a moisture content of the fiber body immediately before being defibrated in the defibrating step is 13.5% to 45.1%, and
    the moisturizer includes —OH groups that intrude in the fiber body to form hydrogen bonds with H groups of the fibers.

2. The method for defibrating a fiber body according to claim 1,
    wherein in the supply step, the liquid is supplied to the fiber body so that the moisture content of the fiber body immediately before defibrated in the defibrating step is 20.8% to 41.2%.

3. The method for defibrating a fiber body according to claim 1,
    wherein the fiber body is a sheet,
    further comprising, between the supply step and the defibrating step, a pulverizing step of coarsely pulverizing the fiber body to which the liquid is supplied.

* * * * *